United States Patent [19]
Glenn

[11] 3,935,763
[45] Feb. 3, 1976

[54] MACHINING VULCANIZED FIBRE

[75] Inventor: Robert B. Glenn, Rochester, N.H.

[73] Assignee: Spaulding Fibre Company, Inc., Tonawanda, N.Y.

[22] Filed: Apr. 23, 1975

[21] Appl. No.: 570,824

[52] U.S. Cl.................................................. 82/1 C
[51] Int. Cl.² .......................................... B23B 3/00
[58] Field of Search........................... 29/1.2; 82/1 C

[56] References Cited
UNITED STATES PATENTS

| | | | |
|---|---|---|---|
| 776,056 | 11/1904 | Haase | 29/1.2 |
| 1,830,027 | 11/1931 | Hayden | 82/1 C |
| 2,309,260 | 1/1943 | Strauss | 82/1 C |
| 2,851,916 | 9/1958 | Grandy et al. | 82/1 C |
| 3,030,859 | 4/1962 | Elliott, Jr. | 82/1 C X |
| 3,064,531 | 11/1962 | Bullock | 82/1 C X |

*Primary Examiner*—Harrison L. Hinson

[57] ABSTRACT

Improvements are provided in the method of manufacturing a ring-shaped part by machining a segment of vulcanized fibre tubing having a predetermined wall thickness and a waste portion adjacent one end of the segment. The wall thickness is reduced in an axially extended region of the waste portion that is spaced from the end of the segment, and a chucking lip, which projects above the adjacent surface of the reduced wall thickness region, is provided intermediate that region and the end of the segment. An annular stop shoulder is provided in the segment surface opposed to the surface which incorporates the chucking lip, whereby a floating mandrel may be positioned against the shoulder to provide support for the tube wall when it is clamped at the chucking lip.

4 Claims, 4 Drawing Figures

MACHINING VULCANIZED FIBRE

BACKGROUND OF THE INVENTION

This invention relates to the machining of vulcanized fibre tubing.

Because of its unique properties, vulcanized fibre has become the predominant, or even sole, material from which various items are manufactured. Other of its properties, however, make it a difficult material to machine, especially where high precision is required of the part to be manufactured (e.g., "rotating bands" for artillery shells).

As is well known to those experienced in the machining of vulcanized fibre materials, such materials are difficult to machine with precision for various reasons, including their tendency to deform in response to forces applied by whatever mechanism is employed to hold the vulcanized fibre material (e.g., a lathe chuck). This problem is particularly acute, of course, where close tolerances are required. Heretofore, the manufacture of such parts has involved the feeding of elongated (e.g., 30 inches) tubes of vulcanized fibre through the hollow spindle of a lathe, clamping the tube around the exterior surface with a short (e.g., 3 inch) segment projecting from the chuck, and performing the necessary turning and final cut-off operations with tools supported on a lathe turret. It has been discovered that with this technique the projecting segment of the tube is deformed by the pressure of the chuck jaws. Upon completion of the ring-shaped part and cut-off from the remainder of the tube, the part resumes its original, unstressed configuration. Since the cuts were made in the deformed shape of the material, the resulting part often deviates from the required tolerances.

SUMMARY OF THE INVENTION

In view of the foregoing, it is a principal object of the present invention to provide a technique of machining tubular vulcanized fibre that facilitates the manufacture of high precision ring-shaped parts.

According to the present invention, improvements are provided in the method of manufacturing a ring-shaped part of predetermined axial length by machining a segment of vulcanized fibre tubing having a predetermined wall thickness and a waste material portion adjacent one end of the segment. According to the invention, preliminary machining of the segment waste portion precedes the actual machining of the ring-shaped part. That preliminary machining includes the reducing of the tube wall thickness in an axially extended region of the waste material portion; providing a chucking lip intermediate that reduced wall thickness region and the segment end, the lip projecting above the adjacent surface of the reduced wall thickness region; and providing an annular stop surface that is spaced from the segment end in the surface of the segment wall opposed to the segment surface which incorporates the chucking lip and that is perpendicular to the tube axis. With these preliminary steps, stop surface may be used for positioning a floating mandrel that resists the compressive force of chuck jaws that engage the chucking lip, thereby substantially reducing the deformation of the vulcanized fibre tube after it has been chucked. The region of reduced wall thickness provides a region of increased tube flexibility which can absorb any residual tube deformation caused by the chucking arrangement and thereby isolate the portion of the segment to be machined into the ring-shaped part from any distortion that remains despite the improved chucking technique.

In preferred embodiments of the invention the reduced thickness region and the chucking lip together occupy substantially the entirety of the waste region; the lip is provided on the exterior surface of the tube segment; and the axial length of the reduced thickness region is between about one-half inch and about 1 inch.

BRIEF DESCRIPTION OF THE DRAWING

Other objects, features, and advantages of the invention will appear from the following description of a particular preferred embodiment, taken together with the accompanying drawing. In the drawing.

DETAILED DESCRIPTION OF A PARTICULAR PREFERRED EMBODIMENT

Figure 1A:
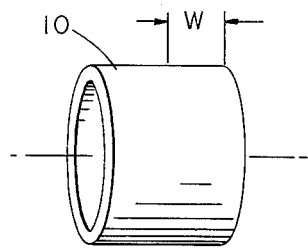
FIGS. 1A, 1B, and 1C illustrate steps in the preparation of a segment of vulcanized fibre tubing for precision machining in accordance with the present invention.
Figure 1B:
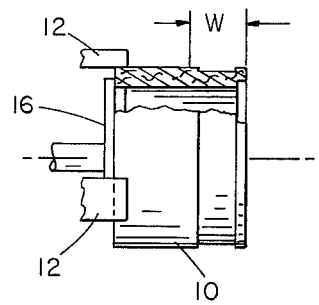
Figure 1C:
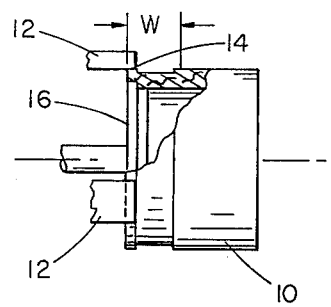

FIGS. 1A, 1B, and 1C illustrate steps in the preparation of a tubular segment of "slug" 10 from which a ring-shaped part is to be manufactured. The slug 10 is a tube of vulcanized fibre having an O.D. of 4.365 inches, a wall thickness of approximately 5/16 inch, and a length of approximately 3½ inches. One type of ring-shaped part (i.e., a rotating band for an artillery shell) has a finished axial length of about 2 inches. There is thus provided a waste material region, W, adjacent one end of the slug 10. The method according to the present invention concerns preliminary machining of this waste region, W, to facilitate high precision machining of the remainder of the slug to produce the required part.

In accordance with the present invention, the slug 10 is first chucked, between conventional chuck jaws 12 and a mandrel 16, to expose the waste end, W, for preliminary machining thereof (see FIG. 1B). After the preliminary machining, the slug 10 is reversed so that the jaws 12 engage a chucking lip 14 (discussed below in connection with FIG. 2), with the floating mandrel 16 now inserted into the waste portion, W, to resist distortion which might be produced by the force of the jaws 12.

The machining of the waste portion, W, and the effect thereof in eliminating distortion in the remainder of the slug 10, may be best described with reference to FIG. 1. The waste portion, W, is turned to provide a chucking lip 14 adjacent an end 18 of the cylindrical slug and a reduced wall thickness region 20 adjacent the chucking lip 14. At least a portion of the wall thickness reduction is provided by lowering the exterior surface 22 of the region 20 by an amount (e.g., 1/32 inch) sufficient to prevent inadvertent contact of a jaw 12 with the surface 22. An annular stop surface 24 is provided in the inside surface of the tube in a plane perpendicular to the tube axis. The stop surface 24 provides an abutment surface for the mandrel 16, which is inserted into the end of the tube with its surface 25 aligned with the jaws 12.

In one preferred embodiment waste material portion, W, has an axial length of about 1⅜ inches, the chucking lip 14 has an axial length of about one fourth inch, the stop surface 24 is spaced about 5/16 inch from the slug end 18, and the region 20 has an axial length of about 1 inch. In an alternative embodiment (not shown) the axial length of the region 20 may be reduced (e.g., one-half inch) to reduce the size of the waste material portion, W. The mandrel 16 is supported to be generally centered within the chuck jaws 12, but is "floating" so that it does not impose a constraint on the positioning of the slug 10. In one preferred form, the mandrel 16 is supported by an elongated rod 26 which is cantilevered from fixed structure (not shown) disposed within the lathe head (not shown).

As will be appreciated by those skilled in the art, the provision of the chucking lip and the stop surface combine to facilitate a distortion-free chucking of the vulcanized fibre slug 10. The reduced thickness portion 20, owing to its increased flexibility, serves to isolate the workpiece portion of the slug 10 from any residual distortion.

While a particular embodiment of the invention has been illustrated in the accompanying drawing and described in detail herein, other embodiments are within the scope of the invention and the following claims.

1. In the method of manufacturing a ring-shaped part of predetermined axial length by machining a segment of vulcanized fibre tubing having a predetermined wall thickness, said segment having a waste material portion adjacent one end thereof, the improvement comprising the preliminary steps of reducing said wall thickness in an axially extended region of said waste material portion that is axially spaced from said one segment end, providing a chucking lip intermediate said region and said one segment end, said lip projecting above the adjacent surface of said region, and providing an annular stop surface spaced from said one segment end in the surface of said segment wall opposed to the segment surface that incorporates said chucking lip.

2. The improvement of claim 1 wherein said region and said lip have a combined axial length equal to at least a major portion of the axial length of said waste material portion.

3. The improvement of claim 1 wherein said lip is provided on the exterior surface of said segment.

4. The improvement of claim 3 wherein said predetermined axial length of said part is about 2 inches, said lip has an axial length of about one-fourth inch, and said region has an axial length of between about one-half inch and about 1 inch.

* * * * *

UNITED STATES PATENT AND TRADEMARK OFFICE
CERTIFICATE OF CORRECTION

PATENT NO. : 3,935,763
DATED : February 3, 1976
INVENTOR(S) : Robert B. Glenn

Figure 2:
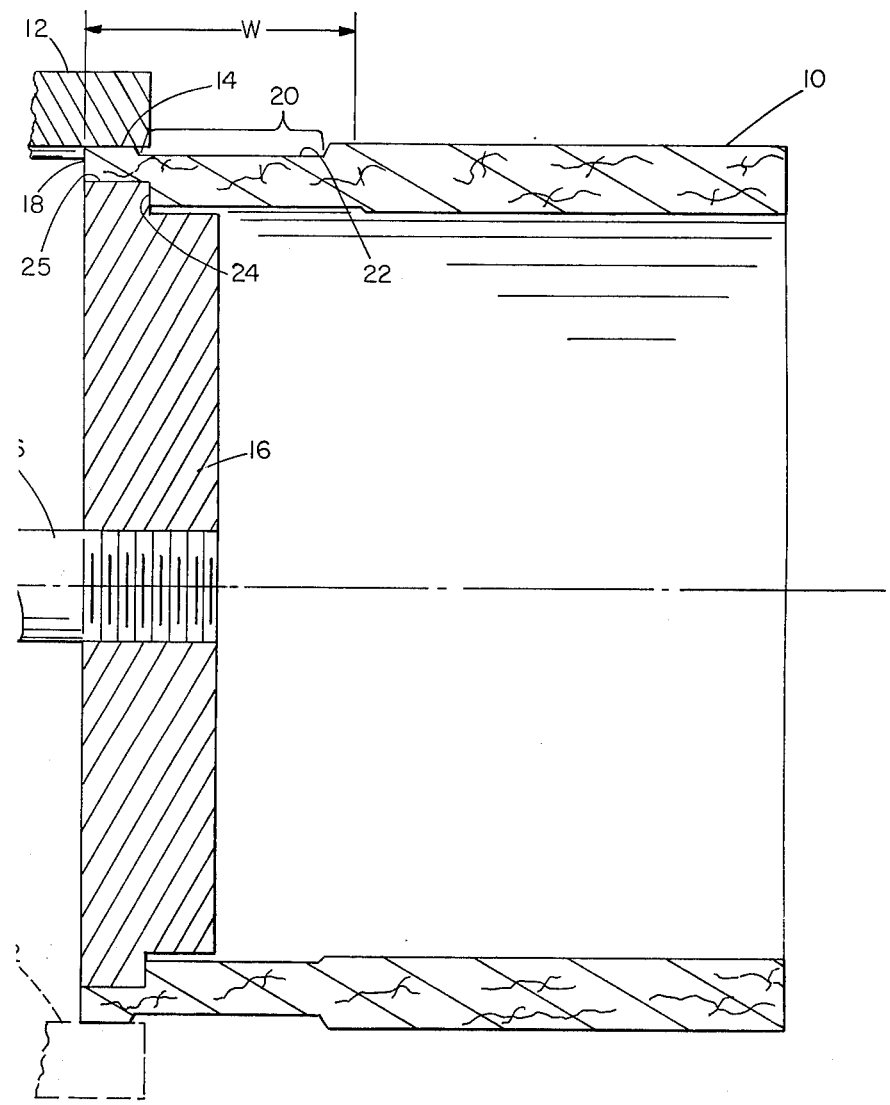
FIG. 2 is an enlarged sectional view, similar to FIG. 1C, taken through the axis of the segment of vulcanized fibre tubing.

It is certified that error appears in the above-identified patent and that said Letters Patent are hereby corrected as shown below:

Column 2, line 28, "of" (second occurrence) should be --or--;

line 33, "rotating band" should be --"rotating band"--;

line 54, "FIG. 1" should be --FIG. 2--.

Signed and Sealed this twentieth Day of April 1976

[SEAL]

Attest:

RUTH C. MASON
Attesting Officer

C. MARSHALL DANN
Commissioner of Patents and Trademarks